United States Patent
Antani et al.

(10) Patent No.: US 8,707,311 B2
(45) Date of Patent: *Apr. 22, 2014

(54) METHOD FOR DYNAMICALLY THROTTLING TRANSACTIONAL WORKLOADS

(75) Inventors: Snehal S. Antani, Hyde Park, NY (US); Neeraj Joshi, Morrisville, NC (US); Sridhar Sudarsan, Round Rock, TX (US); Christopher P. Vignola, Port Jervis, NY (US)

(73) Assignee: International Business Machines Corporation, Armonk, NY (US)

( * ) Notice: Subject to any disclaimer, the term of this patent is extended or adjusted under 35 U.S.C. 154(b) by 65 days.

This patent is subject to a terminal disclaimer.

(21) Appl. No.: 13/417,458

(22) Filed: Mar. 12, 2012

(65) Prior Publication Data

US 2012/0284722 A1 Nov. 8, 2012

Related U.S. Application Data

(63) Continuation of application No. 13/102,501, filed on May 6, 2011.

(51) Int. Cl.
*G06F 9/46* (2006.01)

(52) U.S. Cl.
USPC .......................................... 718/101; 718/104

(58) Field of Classification Search
None
See application file for complete search history.

(56) References Cited

U.S. PATENT DOCUMENTS

| | | | |
|---|---|---|---|
| 5,983,361 A * | 11/1999 | Lee et al. .......................... | 714/19 |
| 6,122,640 A * | 9/2000 | Pereira ........................... | 707/648 |
| 2002/0194142 A1 * | 12/2002 | Coffey ............................ | 705/67 |
| 2003/0149702 A1 | 8/2003 | Saffer et al. | |
| 2004/0158549 A1 * | 8/2004 | Matena et al. ..................... | 707/1 |
| 2005/0256826 A1 * | 11/2005 | Hambrick et al. ................. | 707/1 |
| 2008/0005191 A1 * | 1/2008 | Lashley et al. ................ | 707/202 |
| 2008/0114954 A1 | 5/2008 | Burr et al. | |
| 2009/0112947 A1 * | 4/2009 | Bourbonnais et al. ........ | 707/204 |
| 2009/0265352 A1 * | 10/2009 | Holenstein et al. ............... | 707/8 |
| 2010/0017642 A1 * | 1/2010 | Myers .............................. | 714/2 |

(Continued)

OTHER PUBLICATIONS

Moreira-et al.; "The Case for Full-Throttle Computing: An Alternative Datacenter"; INSPEC/IEEE; vol. 30, No. 4, pp. 25-28; Jul.-Aug. 2010.

(Continued)

*Primary Examiner* — Emerson Puente
*Assistant Examiner* — Maehran Kamran
(74) *Attorney, Agent, or Firm* — Fox Rothschild, LLP; Robert J. Sacco; Carol E. Thorstad Forsyth

(57) ABSTRACT

Systems (100) and methods (200) for managing transactional processing. The methods involve executing a first transaction (120) which is blocked by an exclusive lock of at least one second transaction (110) from accessing at least one resource of a system. Thereafter, a determination is made as to whether a Service Level Agreement ("SLA") associated with the first transaction is being met. If it is determined that the SLA is not being met, the resources needed by the first transaction are identified. Subsequently, all executing transactions, that are using the resources needed by the first transaction, are identified. At least one of the identified transactions is then dynamically slowed down or speed up. The transaction is slowed down or sped up by: adjusting how many records are to be processed in each sub-transaction of the transaction; and/or increasing or decreasing the time period between commit operations of the transaction.

5 Claims, 3 Drawing Sheets

(56) References Cited

U.S. PATENT DOCUMENTS

| | | |
|---|---|---|
| 2010/0107151 A1 | 4/2010 | Thirumalai et al. |
| 2010/0121824 A1* | 5/2010 | Kawamura et al. ............ 707/683 |
| 2010/0138841 A1* | 6/2010 | Dice et al. ..................... 718/107 |
| 2010/0169870 A1* | 7/2010 | Dice ............................. 717/141 |
| 2011/0029490 A1* | 2/2011 | Agarwal et al. ............... 707/684 |
| 2011/0078126 A1* | 3/2011 | Walker .......................... 707/704 |
| 2011/0219218 A1* | 9/2011 | Addala et al. ................. 712/228 |
| 2012/0041926 A1* | 2/2012 | Kundu et al. ................. 707/648 |
| 2012/0278293 A1* | 11/2012 | Bulkowski et al. ........... 707/703 |

OTHER PUBLICATIONS

Foley, S.; "Batch Modernization with WebSphere Compute Grid"; Google/IBM Corporation; 2010.

Follis-et al.; "WebSphere Application Server V7 OSFi, JPA, and Modern Batch Feature Packs"; Google; 2010.

IBM; "New IBM WebSphere Application Server V7 Feature Pack for Modern Batch Promotes Efficient Development and Management of Java Batch Applications in a Java EE . . . "; 2010.

U.S. Appl. No. 13102501, filed May 6, 2011.

\* cited by examiner

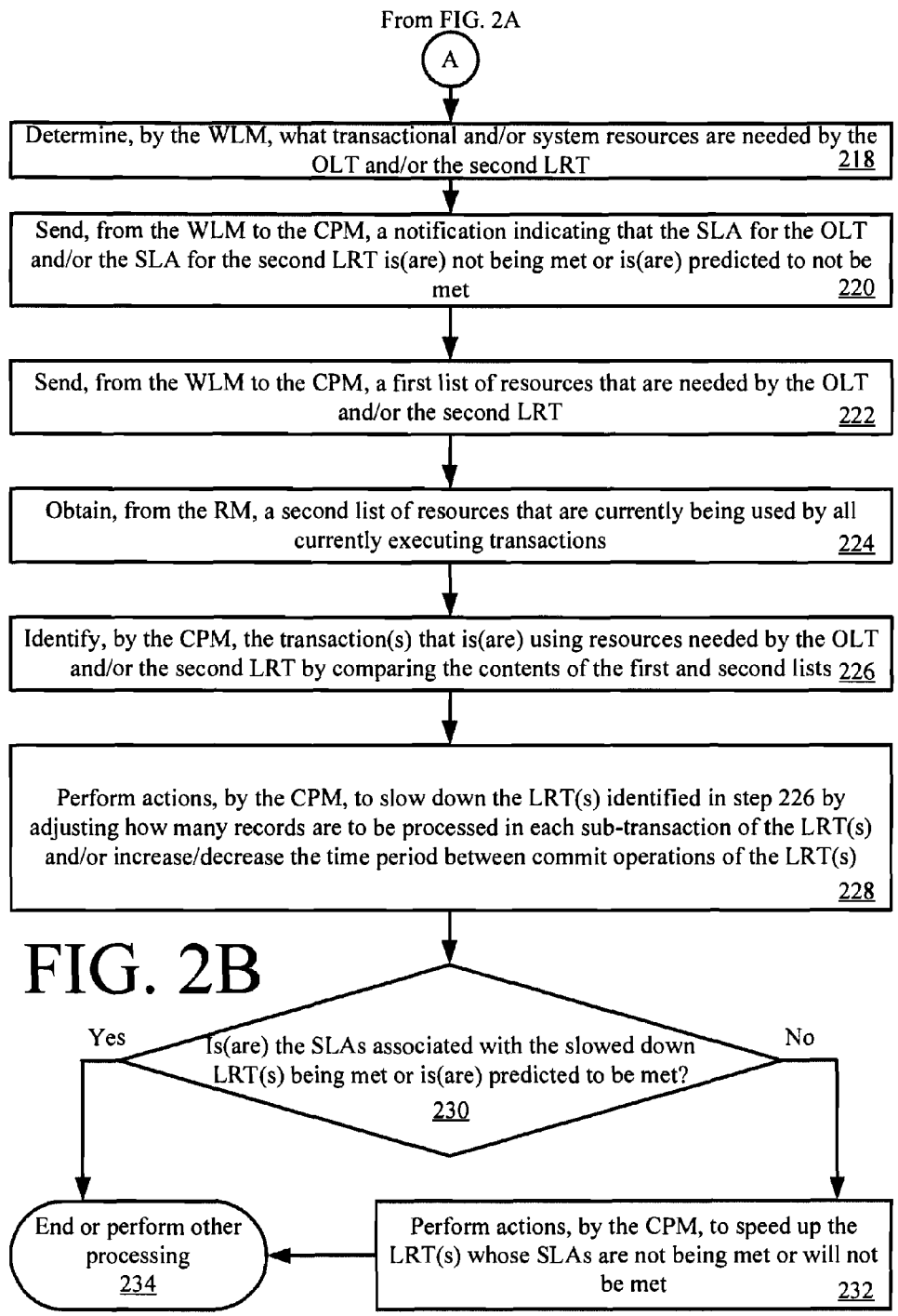

METHOD FOR DYNAMICALLY THROTTLING TRANSACTIONAL WORKLOADS

CROSS REFERENCE TO RELATED APPLICATIONS

This application is a continuation of, and claims priority to, U.S. application Ser. No. 13/102,501, filed May 6, 2011, which is hereby incorporated by reference in its entirety.

BACKGROUND OF THE INVENTION

1. Statement of the Technical Field

The inventive arrangements relate to transaction oriented computer systems, and more specifically, to transaction processing systems that employ autonomic computing for managing transactional processing.

2. Description of the Related Art

There are many conventional Transaction Processing Systems ("TPSs") known in the art. These conventional TPSs employ transaction software that facilitates the provision of transactional services to users of the TPSs. The transactional services enable the users to initiate transactions (or events) for generating data that is to be stored in databases of the TPSs and for modifying data that is already stored in the databases of the TPSs. There are many types of transactions. For example, there are Long Running Transactions ("LRTs") and OnLine Transactions (OLTs). LRTs can include, but are not limited to, end of month processing, inter-bank transactions, whole bank transactions, inventory management transactions, and real time inventory transactions. More particularly, LRTs include transactions in which batches of N records are processed in multiple iterations of a processing loop. The value of N may be a fixed value or a variable whose value is varied based on response times of transactional work. Each LRT involves processing several sub-transactions (e.g., print monthly statement for account 1, print monthly statement for account 2, . . . , print monthly statement for account N) at the same time. There is a time delay between the entering of each sub-transaction and the availability of the results of the same. OLTs include, but are not limited to, user initiated commercial transactions (e.g., an electronic banking transaction, an order processing transaction, an e-commerce transaction and an eTrading transaction) in which data is entered into the TPSs and/or data is retrieved from the TPSs. More particularly, OLTs include transactions that require a short response time as compared to that of the LRTs.

Notably, TPSs are designed to provide a high degree of data integrity. The data integrity is provided by ensuring that the data managed by the TPSs is left in a consistent state. For example, if an electronic payment is made by a user of a TPS, then the amount of the electronic payment must be (1) withdrawn from the user's account and (2) added to another user's account. If the TPS can not complete both (1) and (2), then the TPS should not perform operations for providing OLT services (1) or (2). If a failure occurs that prevents completion of OLT services (1) and (2), then the partially executed transaction or event must be rolled back by the TPS, i.e., a database is restored to its previous state.

The data integrity is also provided by database locking. Database locking serves to protect shared resources and objects. The protected resources can include, but are not limited to, tables, data rows, data blocks, cached items, connections and entire TPSs. There are many types of database locking. One such type of database locking is transactional locking. Transactional locking can occur when two or more transactions are attempting to make changes to data stored in the same table, row(s) of the table and/or storage device. For example, a first user action for an LRT obtains an exclusive lock on the table when issuing a first updated statement. Subsequently, a second user action for an OLT attempts to update the same row(s) of the table. Consequently, the second user action is blocked by the exclusive lock of the first user action, i.e., the second user action cannot proceed with its transactional work until it has obtained a lock to the required transactional resources (e.g., the row(s) of the table). When the first user action commits its transaction, its exclusive lock is released and the second user action is allowed to be completed. At this time, the second user action obtains an exclusive lock to the row(s) of the table, and therefore blocks any other user actions from simultaneously modifying the data in the row(s) of the table. The following TABLE 1 illustrates the above described transactional locking.

TABLE 1

| Time | First User Action | Second User Action |
|------|-------------------|--------------------|
| 1 | Starts Transaction | |
| 2 | | Starts Transaction |
| 3 | Updates Row(s) In Table | |
| 4 | | Attempts To Update Row(s) |
| 5 | | Second User Action Is Blocked By The Lock Of The First User Action |
| 6 | Commits Transaction | |
| 7 | | Update Row(s) In Table |
| 8 | | Commits Transaction |

As a result of database locking, concurrently executing transactions are adversely effected. This adverse effect is undesirable when high priority transactions are unable to quickly access their needed transactional resources (e.g., a row of a table). The inability of the high priority transactions to quickly access their needed transactional resources can affect specified Service-Level Agreements ("SLAs"). An SLA is a part of a service contract where the level of service is formally defined. The SLA will typically have a technical definition in terms of Mean Time Between Failures (MTBF), Mean Time to Repair (MTR), data rates, throughput, jitter and/or other measureable parameters.

WorkLoad Managers (WLMs) are typically found in TPSs. WLMs control when to start and stop processes for transactional work execution. WLMs also control the allocation of and access to system resources of the TPSs based on administrator-defined goals. The system resources include, but are not limited to, system processors, Input/Output ("I/O") units and system storage. The goals define performance expectations for transactional work and ensure that SLAs are met for transactional workloads. Goals are often expressed as response times and relative speeds. The response time describes the duration for a transactional work request after it is entered into a TPS and until the WLM is notified that the transactional work has been completed. The relative speed is defined by the following Mathematical Equation (1).

$$\text{Relative Speed} = 100 \cdot (\text{Total Using Samples}/(\text{Total Using Samples} + \text{Total Delay Samples})) \quad (1)$$

During operation, each WLM determines if the performance expectations have been met for transactional work. If the WLM determines that the performance expectations have not been met, then it will adjust the access of the transactional work to the system resources.

The actions taken by the WLMs sometimes exacerbate the aforementioned problem by allocating more system resources (e.g., central processing units) to the higher priority OLT work and/or de-allocating system resources (e.g., central processing units) to the lower-priority LRT work. But since the database locks held by the LRTs are the inherent problem, slowing down the execution of a transaction interval will actually further deny access to the needed system resources by the higher-priority OLT work. A transaction interval is the amount of time between the entering of a transactional work request into a TPS and the completion of the transactional work.

Many solutions have been employed to alleviate the above-referenced problems. A first solution includes executing LRTs at different times than when OLTs are scheduled to be executed. For example, LRTs can be executed during hours (e.g., 1 AM-5 AM) when a business organization is closed. In this scenario, the LRTs and OLTs will not compete for system and transactional resources. As such, OLT transactions will not be blocked from accessing needed system and transactional resources as a result of LRT database locks. Although this solution ensures that LRTs and OLTs will not compete from system and transactional resources, this solution does not work for many global business organizations which serve multiple time zones and geographies.

A second solution addresses CPU management for workloads of varied dispatch priorities. This solution involves assigning a dispatch priority to different units of work. For example, LRTs are assigned a low dispatch priority and OLTs are assigned a high dispatch priority. In this scenario, OLTs will be dispatched more often than LRTs. As such, OLTs are provided with more Central Processing Unit (CPU) time as compared to that provided to the LRTs. Although this solution ensures that OLTs will be provided with sufficient CPU time, it is not operative with the totality of different hardware and operating systems that are available in commerce. Therefore, not every user of the TPSs can choose the second solution.

A third solution includes statically defining commit intervals (or batch commits) associated with LRTs. The phrase "commit interval (or batch commit)", as used here, refers to the number of items (e.g., records) that will be processed before a transaction is committed to memory. In this static scenario, TPSs lack the agility to respond to request patterns of a TPS since the commit intervals are static for the durations of LRTs. TPSs are also exposed to the possibility that higher-priority OLT work is denied access to its needed system or transactional resources while lower-priority LRT work is allowed to run.

A fourth solution involves releasing database locks in a timely fashion. This lock releasing is done under the control of the LRT applications and OLT applications. As a consequence, this solution does not offer itself as a generalized solution for users to optimized their systems and achieve overall SLA compliance across their entire workloads.

BRIEF SUMMARY OF THE INVENTION

The present invention generally concerns implementing systems and methods for managing transactional processing. The methods involve executing a first transaction which is blocked by an exclusive lock of at least one second transaction from accessing at least one of a plurality of resources of a Transaction Processing System ("TPS"). Each of the first and second transactions is an LRT or an OLT. Thereafter, a determination is made as to whether a first Service Level Agreement ("SLA") associated with the first transaction is being met. If it is determined that the first SLA is not being met, then the resources that are needed by the first transaction are identified. Also, all executing transactions that are using the resources needed by the first transaction are identified. At least one of the identified transactions is then slowed down or sped up. The transaction is slowed down or sped up by: adjusting how many records are to be processed in each sub-transaction of the transaction; and/or increasing or decreasing the time period between commit operations of the transaction. The transaction may also be slowed down or sped up based on its priority and the priority of the first transaction. If the transaction is slowed down, a determination is made as to whether a second SLA associated with the transaction is being met. If it is determined that the second SLA is not being met, then the transaction is sped up.

BRIEF DESCRIPTION OF THE DRAWINGS

Embodiments will be described with reference to the following drawing figures, in which like numerals represent like items throughout the figures, and in which:

FIGS. 2A-2B collectively provide a flow diagram of an exemplary method for managing transactional processing that is useful for understanding the present invention.

DETAILED DESCRIPTION

Figure 1:
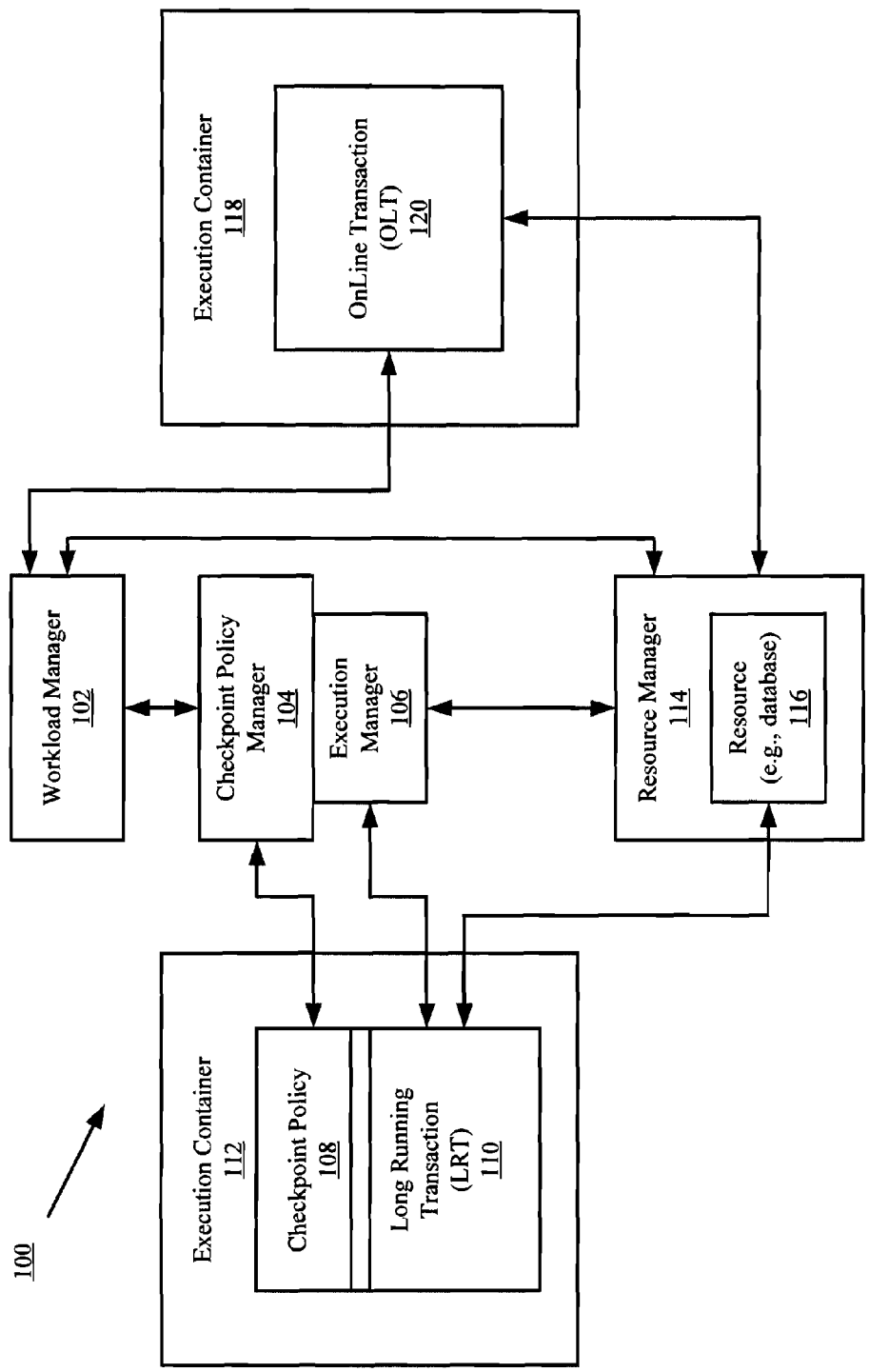
FIG. 1 is a block diagram of an exemplary transactional processing system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present invention generally concerns systems and methods for autonomically controlling checkpoint intervals at a fine-grained level for LRTs. The term "autonomic", as used herein, refers to the ability to function independently without outside influence. The methods involve aggregating data from a resource manager and a WLM. The result of the aggregation is then used to make an intelligent decision for which specific LRTs to throttle up or down. The term "throttle", as used herein, means to regulate the speed at which transactions are processed. For example, if a transaction has been throttled down, then the processing associated therewith has been stopped or the processing speed has been slowed. In contrast, if a transaction has been throttled up, then the processing speed has been increased. The throttling down of an LRT speed is typically achieved by decreasing a checkpoint interval of an LRT. The manner in which the checkpoint interval is adjusted will become more evident as the discussion progresses.

The present invention can be used in a variety of applications. Such applications include, but are not limited to, banking applications, airline applications, mail order applications, supermarket applications, manufacturing applications, cloud computing applications and any other application in which transactional processing needs to be managed. Prior to discussing exemplary system and method embodiments of the present invention, general concepts are described that are useful for understanding the present invention. Thereafter, exemplary implementing systems will be described in relation to FIG. 1. Exemplary method embodiments of the present invention will be described below in relation to FIGS. 2A-2B.
Discussion of General Concepts that are Useful for Understanding the Present Invention The essence of the present invention is to introduce the notion of managed checkpoints and a checkpoint policies. The checkpointing functions of the present invention are implemented via a dynamic checkpointing mechanism. The checkpointing mechanism generally comprises software and/or hardware configured to copy the contents of a primary memory that can be affected by system failures into a secondary memory (e.g., a disk) which can not be affected by such system failures. This data copying occurs at defined checkpoints. The time between two (2) checkpoints is referred to herein as a "checkpoint interval". During operation, the checkpointing mechanism monitors the transaction rates for OLT workloads and throttles down LRT workloads bound to a corresponding SLA (or policy) when the transaction rates are not specified within the SLA. The term "throttle", as used herein, means to regulate the speed at which transactions are processed. For example, if a transaction has been throttled down, then the processing associated therewith has been stopped or the processing speed has been slowed. In contrast, if a transaction has been throttled up, then the processing speed has been increased. The throttling down of an LRT speed is typically achieved by decreasing a checkpoint interval of an LRT. The decision to modify the checkpoint interval is based on fine-grained data. Fine-grained data is data that is transferred among processors frequently in amount of one or a few memory words.

The LRTs and checkpoint mechanisms collectively facilitates efficient data processing. The processing efficiency is a result of processing data in bulk during an LRT while eliminating the need to rollback all the completed work. The term "rollback" refers to an operation which returns a database to some previous state, i.e., the database is restored to a clean copy even after erroneous operations are performed. The rollback requirement is eliminated by periodically copying the contents of a primary memory into a secondary memory (e.g., a disk) during LRT processing, i.e., by periodically performing checkpointing during the LRT processing.

The following EXAMPLE 1 is provided for purposes of explaining in more detail the operations of LRTs and managed checkpointing. The present invention is not limited to the contents of EXAMPLE 1.

Example 1

An LRT involves calculating the interest on one million (1,000,000) bank accounts at the end of a particular month. A system failure occurs during data processing for bank account record ninety-nine thousand nine hundred ninety-nine (99,999). As noted above, it is undesirable to rollback all the LRT work that has been completed thus far (i.e., data processing for bank account records 1-99,998). To avoid the need to rollback the LRT work, a checkpointing mechanism is employed. The checkpointing mechanism periodically takes snap-shots of the computational progress of the LRT processing. Stated differently, the contents of a primary memory is periodically copied into a secondary memory (e.g., a disk) during the LRT processing. As a result of the checkpointing, all or a significant portion of the completed work can be recovered subsequent to the system failure.

The LRT processing and checkpointing are implemented in a TPS via a batch/bulk paradigm offered by a batch execution environment. In the batch execution environment, container services are provided that manage longer transactions in which as must work as possible is to be performed. The container service is implemented via the following ALGORITHM 1.

---
ALGORITHM 1
---
```
for (1,000,000 records)
{
    transaction.begin ( )
    for (1000 records)
    {
        read record
        process record
        write record
    }
    transaction.commit( )
}
```
---

In ALGORITHM 1, there are one million to one thousand (1M/1K) sub-transactions. Each sub-transaction involves performing an iteration of an LRT processing loop. The LRT processing loop involves performing LRT processing for one thousand (1,000) records. After completing the first iteration of an LRT processing loop, the completed work is committed to memory, i.e., the contents of the primary memory is copied into the secondary memory. If the system failure occurs in a second iteration of the LRT processing loop, then the resumed LRT processing will not start for record one (1). Rather, the LRT processing will resume from the committed point, i.e., the resumed LRT processing will start from record one thousand one (1,001).

Despite the advantages of ALGORITHM 1, it suffers from certain drawbacks. For example, ALGORITHM 1 is a static algorithm in which the number of records that are processed in each sub-transaction is fixed for the life of the LRT process. Also, the time between two commits or checkpoints is fixed for the life of the LRT process.

The present invention overcomes the above described drawbacks by facilitating the manipulation of the number of records that are being processed during a sub-transaction interval and the time between two (2) commits. The manipulation feature of the present invention is important because when a transaction begins, data is accessed. The data is locked for the life of the sub-transaction. Once results of the sub-transaction have been committed, the data is unlocked and other LRTs or OLTs processes are allowed access to the data. If the priority of the LRTs and OLTs is understood, then the parameters of ALGORITHM 1 can be manipulated during the LRT processing. For example, the number of records that are locked during an LRT process and how long the records are locked can be manipulated. As such, the present invention involve balancing how many records get locked during a transaction and for how long the records are locked. The balancing is done in the context of other transactional work in the TPS, the priorities of the transactional work and deadlines of the transactional work.

The following ALGORITHM 2 illustrates how the present invention operates. More particularly, the following ALGORITHM 2 shows how the number of records that are locked during an LRT process can be manipulated during an LRT process. ALGORITHM 2 also shows how the duration in which the records are locked can be manipulated during an LRT process. ALGORITHM 2 further shows how the commit interval or checkpoint interval can be manipulated during an LRT process.

---
ALGORITHM 2
---
```
for (1,000,000 records)
{
    transaction.begin ( )
    for (X records) // X can be manipulated
    {
        read record
        process record
        write record
    }
    transaction.commit( )
    sleep (Y) // Y can be manipulated
}
```
---

In ALGORITHM 2, there are one million to "X" (1M/X) sub-transactions. "X" can have any integer value from zero (0) to infinity ($\infty$). Each sub-transaction involves performing an iteration of an LRT processing loop. The LRT processing loop involves performing LRT processing for "X" records. After completing the first iteration of an LRT processing loop, the completed work is committed to memory, i.e., the contents of the primary memory is copied into the secondary memory. If the system failure occurs in a second iteration of the LRT processing loop, then the resumed LRT processing will not start for record one (1). Rather, the LRT processing will resume from the committed point, i.e., the resumed LRT processing will start from record "X+1".

Notably, the value of "X" is determined in real time and can be dynamically changed during the LRT process. In effect, the LRT can be slowed down or sped up based on SLAs and transactional deadlines. For example, the values of "X" can be dynamically selected to be a relatively small number or a relatively large number based on the load on the TPS, the load on the database, the priority of an LRT compared to the priority of other transactions of the TPS, and/or the deadlines of the transactions. If "X" is a small number, then resource locks are released relatively quickly. In contrast, if "X" is a large number, then resource locks are released relatively slowly. The value of "X" can be changed one or more times during the LRT process.

The value of "Y" is also determined in real time and can be dynamically changed during the LRT process. The value of "Y" may be decreased for purposes of yielding system resource (e.g., a CPU) to other transactions. The resources are yielded by putting the LRT processing to sleep for a certain period of time (e.g., 1 second). After expiration of the "sleep period of time" or "Y", the system resources are again utilized by the LRT. The value of "Y" can be changed one or more times during the LRT process. "Y" can have any integer value from zero (0) to infinity ($\infty$).

System Embodiments of the Present Invention

Figure 2A:
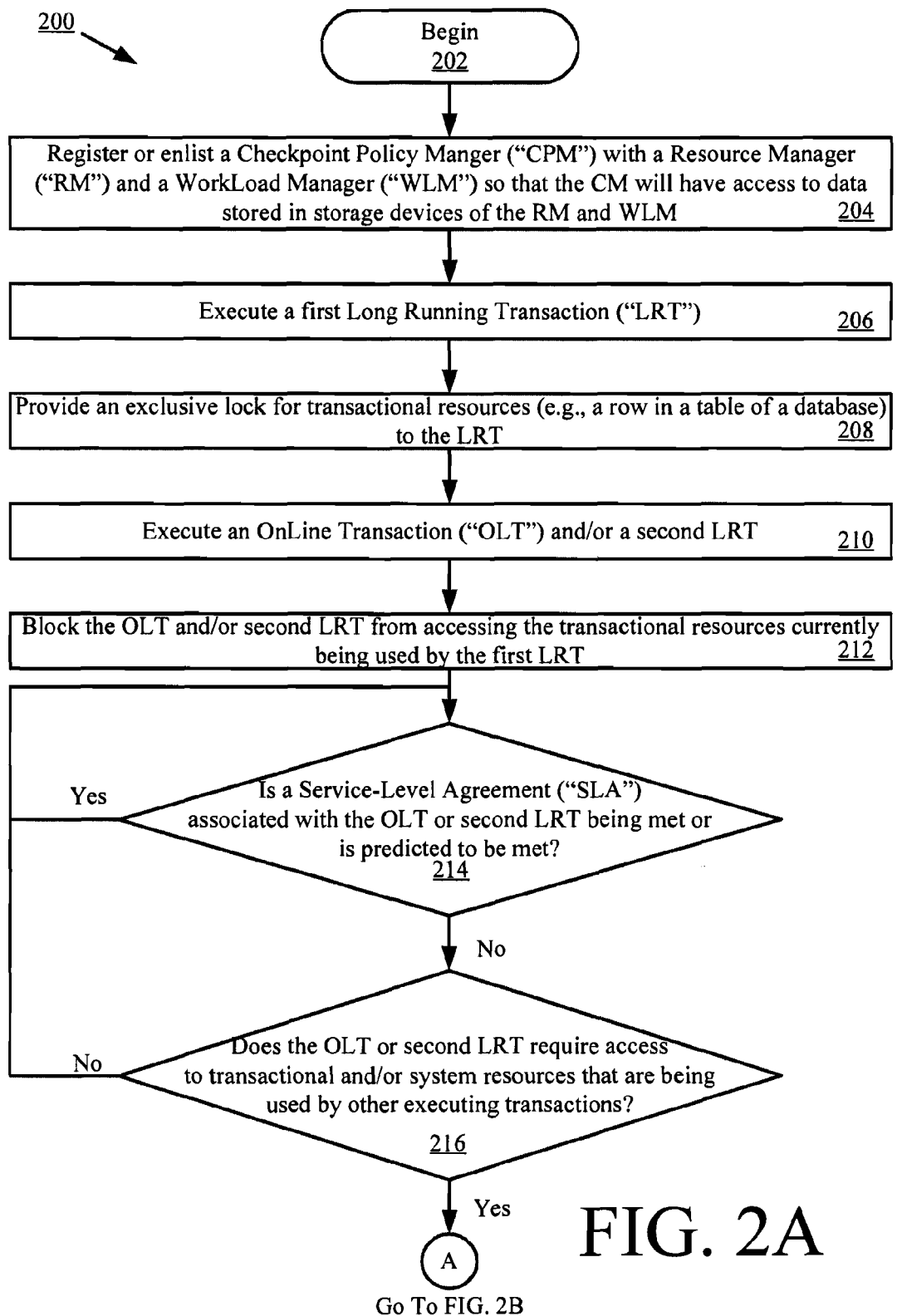

Referring now to FIG. 1, there is provided a block diagram of an exemplary TPS 100 that is useful for understanding the present invention. The TPS 100 is generally configured to dynamically throttle (i.e., speed up or slow down) LRT processing in a multi-computing environment. The throttling of the LRT workloads is at least partially achieved by dynamically and autonomously setting checkpoint intervals of the LRTs based on fine-grained data. As a consequence of employing fine-grained data for purposes of deciding whether to modify checkpoint intervals, TPS 100 is less computationally and hardware intensive as compared to conventional TPSs employing coarse-grained data for determining how many records should be processed during each sub-transaction of a static LRT process (i.e., an LRT process in which the number of records to be processed in each sub-transaction is fixed for the duration of the LRT process).

As shown in FIG. 1, TPS 100 comprises a WLM 102, a Checkpoint Policy Manager ("CPM") 104, an Execution Manager (EM) 106, Execution Containers ("ECs") 112, 118 and a Resource Manager ("RM") 114. The listed components 102-118 collectively implement method embodiments of the present invention. An exemplary method embodiment will be described below in relation to FIGS. 2A-2B. The components can be implemented in hardware and/or software.

In some embodiments of the present invention, each of the listed components 102-118 is implemented in a computer system. In this scenario, the computer system includes a computer readable storage medium having instructions stored thereon and a processing device communicatively coupled to the computer readable storage medium. The computer readable storage medium includes, but is not limited to, a single medium or multiple media e.g., a centralized or distributed database, and/or associated caches and servers) that store, encode or carry the one or more sets of instructions. The processing device is configured to execute the instructions that cause the computer system to execute a software application that implements method embodiments of the present invention. As noted above, exemplary method embodiment will be described below in relation to FIGS. 2A-2B.

Referring again to FIG. 1, the WLM 102 includes transaction related information stored in a storage device (not shown in FIG. 1) thereof. The transaction related information at least specifies: the priorities of LRTs 110, OLTs 120 and other transactions of the TPS 100; the transactional resources and system resources (e.g., CPU and database) 116 that are available at any given time; and the amount of the transactional resources and system resources 116 that is available at any given time. The transaction related information can be stored in accordance with any format, such as a table format.

The RM 114 manages access to transactional resources and system resources 116. The RM 114 includes resource related information stored in a storage device (not shown in FIG. 1) thereof. The resource related information at least specifies: how much load is on a resource 116 (e.g., a database); how much contention exists in the TPS 100 between transactions 110, 120; what transactions 110, 120 are waiting for transactional resources and system resources; what transactions 110, 120 are currently using transactional resources and system resources. The resource related information can be stored in accordance with any format, such as a table format.

The CPM 104 manages LRT processing. For example, the CPM 104 communicates with the EM 106 for controlling when to start or execute an LRT. The CPM 104 also communicates with the WLM 102 and CPM 104 for obtaining the transaction related information and the resource related information therefrom. In this regard, the CPM 104 registers or enlists itself with the WLM 102 and RM 114. After registering or enlisting itself with the WLM 102 and RM 114, the CPM 104 can access to data such as transaction priorities, performance metrics and resource consumption metrics. The performance metrics can include, but are not limited to, a completion time metric (i.e., a measurement of elapsed time against an assigned completion time goal—e.g., complete in 120 minutes after starting), a velocity metric (i.e., a percent CPU over unit time measure against velocity goal—e.g., 70% every N seconds), and a transactional response time metric (i.e., a time spent completing each transaction—e.g., a checkpoint). The resource consumption metrics can include, but are not limited to, a percentage CPU consumption metric, a percentage virtual storage paging rate metric, and a lock hold time metric. The CPM 104 uses the data to determine how to manipulate the "X" and "Y" values of ALGORITHM 2 (described above) during the execution of a corresponding LRT 110. ALGORITHM 2 is implemented by EC 112 as a checkpoint policy 108.

During operation, LRT 110 is executed by TPS 100. LRT 110 has an associated checkpoint policy 108. The LRT 110 holds an exclusive lock to resource 116. OLT 120 is also executed by TPS 100. However, OLT 120 is blocked from accessing resource 116 by the exclusive lock of LRT 110, i.e., TPS 100 cannot proceed with its OLT 120 transactional work until the OLT 120 has obtained a lock to the required resources 116.

The WLM 102 detects that the SLA for OLT 120 is not being met. Based on various metrics, the WLM 102 determines whether the OLT 120 requires access to one or more transactional and/or system resources 116 being used by the LRT 110. For example, the determination can be made based on the number of CPU cycles used by the OLT 120. If the WLM 102 finds that there is a low CPU usage by OLT 120, then it concludes that no OLT 120 work is being done by TPS 100. As such, there is a likely contention issue between LRT 110 and OLT 120 regarding transactional and/or system resources 116. Consequently, WLM 102 determines that OLT 120 requires access to one or more transactional and/or system resources 116 being used by LRT 110. Subsequent to determining that the OLT 120 requires access to one or more resources 116 being used by the LRT 110, the WLM 102 determines what resources 116 are needed by the OLT 120. This determination is made using transaction related information and resource related information obtained from RM 114.

Thereafter, the WLM 102 notifies the CPM 104 that the SLA for OLT 120 is not being met. The WLM 102 also provides the CPM 104 with a list of resources that are needed by the OLT 120. The CPM 104 then determines the cause for why the SLA is not being met, i.e., identifies which executing transactions (e.g., LRTs) are using resources needed by the OLT 120. This determination is made using a list of resources that are currently being used by one or more executing transactions (e.g., LRTs). The list of resources is obtained from RM 114. The list of resources can include a table in which resource identifiers are associated with identifiers for the executing transactions (e.g., LRTs). The contents of the list of resources obtained from RM 114 are compared to the contents of the list of resources received from WLM 102.

Once the CPM 104 indentifies the transactions (e.g., LRTs) that are using resources needed by the OLT 120, it performs actions to speed up or slow down the processing related to the identified LRTs. The throttling of each LRT is achieved by selecting values for parameters "X" and "Y" of ALGORITHM 2, and setting parameters "X" and "Y" equal to the respective selected values.

The following EXAMPLE 2 is provided for purposes of explaining in more detail the operations performed by the TPS 100. The present invention is not limited to the contents of EXAMPLE 2.

Example 2

A CheckBalance ("CB") software application is provided to the users (e.g., bank customers) of a TPS (e.g., TPS 100 of FIG. 1). The CB software application is an OLT based software application for performing OLT processing jobs. The SLA requirements for OLT processing jobs are to: (1) process ninety percent (90%) of user requests every hour; and (2) complete each request in less than one (1) second.

In this example, the CB software application allows the users to login to check balances on their bank accounts. The information relating to their bank accounts is stored in an account database of the TPS. The account database (e.g., resource 116 of FIG. 1) is accessed during OLT processing which is performed at the request of the CB software application.

A Posting Batch ("PB") software application is also provided to users (e.g., banks) of the TPS. The PB software application is an LRT based software application for performing LRT processing jobs. The SLA requirements for the LRT processing jobs are to: (1) complete each posting as soon as possible; and (2) complete each posting within six (6) hours from when a posting file arrives.

In this example, the PB software application is operative to process files from various sources that are continually coming in and need to be processed throughout the day. In order to effectuate the file processing, the account database is accessed during LRT processing which is performed at the request of the PB software application. The PB software application reuses the CB service before it makes postings.

A WLM (e.g., WLM 102 of FIG. 1) is configured to the policies of the above-described SLAs. During operation, the WLM determines whether SLA violations have occurred. In this regard, the WLM has a first table stored therein which associates system and transactional resources with transaction Identifiers ("IDs"). The WLM also has a second table stored therein which associates SLA metrics with transaction IDs. The SLA metrics can include, but are not limited to, an MTBF metric, an MTR metric, a data rate metric, a throughput metric, a jitter metric, a transactional priority metric, a response time metric, and a transactional deadline metric. The WLM continuously monitors transaction processing to determine when a transaction processing job is at risk of completion. This determination is made using the contents of the first and second tables. When a determination is made that a transaction processing job is at risk of completion, the WLM will issue a notification to a CPM (e.g., CPM 104 of FIG. 1). For example, the WLM issues a notification to the CPM when, at forty-five minutes (45 min) to the hour, ninety percent (90%) of the OLT processing requests are taking more than one second (e.g., 1.2 seconds), i.e., that its SLA is not being met. The WLM also obtains a first list of system and/or transactional resources which are being used by the OLT and/or needed by the OLT. The list of resources is then communicated from the WLM to the CPM.

When the CPM is notified by the WLM that the SLA for the OLT is not being met, it issues a system call query to an RM (e.g., RM 114 of FIG. 1) for obtaining a second list of system and/or transactional resources that are being used for all transactional processing jobs that are currently executing in the TPS. Thereafter, the CPM uses the first and second lists to determine the cause for why the SLA is not being met, i.e., identifies the LRT(s) that is(are) using resources needed by the OLT. This determination is made by comparing the contents of the first list to the contents of the second list.

Once the CPM indentifies the LRT(s) that (is)are using resources needed by the OLT, it performs actions to speed up or slow down the processing related to the identified LRT(s). The throttling of each LRT is achieved by selecting values for parameters "X" and "Y" of ALGORITHM 2, and setting parameters "X" and "Y" equal to the respective selected values.

It should be noted that in some scenarios the SLA of the LRT may be at risk of not being met (e.g., the six hour deadline may be approaching). In these sceneries, other LRTs can be slowed down and the OLT can be sped up so that the SLA of the LRT will be met.

Method Embodiments of the Present Invention

Referring now to FIG. 2, there is provided a flow diagram of an exemplary method 200 for managing transactional processing that is useful for understanding the present invention. The method 200 begins with step 202 and continues with step 204. In step 204, a CPM (e.g., CPM 104 of FIG. 1) registers or enlists itself with an RM (e.g., RM 114 of FIG. 1) and a WLM (e.g., WLM 102 of FIG. 1) so that the CM will have access to data stored in storage devices of the RM and WLM. The data can include, but is not limited to, transaction related data and resource related data. The transaction related data includes, but is not limited to, information that specifies: the priorities of LRTs, OLTs and other transactions of the TPS; the transactional resources (e.g., a row of a database) and system resources (e.g., CPU and database) that are available at any given time; and the amount of the transactional resources and system resources that is available at any given time. The resource related data includes, but is not limited to, information that specifies: how much load is on a resource (e.g., a CPU and/or a database); how much contention exists in the TPS between the transactions thereof; what transactions are waiting for transactional resources and system resources; what transactions are currently using transactional resources and system resources.

After completing step 204, step 206 is performed where a first LRT (e.g., LRT 110 of FIG. 1) is executed by a TPS (e.g., TPS 100 of FIG. 1). As a consequence of said execution, the LRT obtains an exclusive lock on transactional resources (e.g., a row in a table of a database 116 of FIG. 1). In a next step 210, an OLT (e.g., OLT 120 of FIG. 1) and/or a second LRT is executed by the TPS. Notably, the OLT and/or second LRT is(are) blocked by the exclusive lock of the first LRT from accessing the transactional resources currently being used by the first LRT, as shown by step 212.

Subsequent to the completion of step 212, the method 200 continues with a decision step 214. If an SLA associated with the OLT or the second LRT is being met or is predicted to be met [214:YES], then the method 200 returns to step 214. If the SLA associated with the OLT or the second LRT is not being met or will not be met [214:NO], then a decision step 216 is performed. Decision step 216 involves determining whether the OLT or the second LRT requires access to transactional and/or system resources that are currently being used by other executing transactions. If the OLT or the second LRT do not require access to any resources that are currently being used by other executing transactions [216:NO], then the method 200 returns to step 214. However, if the OLT or the second LRT does require access to resources that are currently being used by other executing transactions [216:YES], then the method 200 continues with step 218 of FIG. 2B.

As shown in FIG. 2B, step 218 involves determining, by the WLM, what transactional and/or system resources are needed by the OLT and/or the second LRT. Thereafter in step 220, the WLM notifies the CPM that the SLA for the OLT and/or the SLA for the second LRT is(are) not being met or is(are) predicted to not be met. The WLM also sends to the CPM a first list of resources that are needed by the OLT and/or the second LRT, as shown by step 222.

In response to receiving the notification and first list from the WLM, the CPM obtains from the RM a second list of resources that are currently being used by all executing transactions of the TPS, as shown by step 224. Next, the CPM performs step 226. Step 226 involves indentifying the transaction(s) that is(are) using resources needed by the OLT and/or the second LRT. The transaction(s) is(are) identified by comparing the contents of the first list to the contents of the second list. Step 226 can also involve selecting the identified transaction(s) that have a lower priority than the OLT and/or the second LRT. Once the transaction(s) is(are) identified and/or selected, the CPM performs actions to manage transactional processing, as shown by step 228. More particularly, the CPM slows down the LRT(s) identified/selected in step 226 by adjusting how many records are to be processed in each sub-transaction of the LRT(s) and/or increases/decreases the time period between commit operations of the LRT(s). The number of records is adjusted by changing the value of parameter "X" of the above-described ALGORITHM 2. Similarly, the time period between commit operations is adjusted by changing the values of the parameter "X" and/or "Y" of the above-described ALGORITHM 2. Embodiments of the present invention are not limited in this regard. For example, transactions having priorities higher than the priorities of the OLT and/or the second transaction can alternatively and/or additionally be selected in step 226. In these scenarios, the "higher priority" transactions are speed up in step 228 rather than slowed down as stated above.

After slowing down the identified/selected LRT(s), a decision is made in step 230 as to whether the SLA(s) associated with the slowed down LRT(s) is(are) being met or is(are) predicted to met. If the SLA(s) is(are) not being met or will not be met [230:NO], then step 232 is performed. Step 232 involves performing, by the CPM, actions to speed up the LRT(s) whose SLA(s) is(are) not being met or will not be met. Thereafter, step 234 is performed where the method 200 ends or other processing is performed. If the SLA(s) is(are) being met or will be met [230:YES], then step 234 is performed.

In light of the forgoing description of the invention, it should be recognized that the present invention can be realized in hardware, software, or a combination of hardware and software. A method for managing transactional processing according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for managing transactional processing, comprising:
    executing a first transaction which is blocked by an exclusive lock of at least one second transaction from accessing at least one of a plurality of primary resources of a Transaction Processing System ("TPS");
    determining whether a first Service Level Agreement ("SLA") associated with the first transaction is being met;
    identifying which of the plurality of primary resources are needed by the first transaction if it is determined that the first SLA is not being met;
    identifying all transactions that are currently being executed and that are using the primary resources needed by the first transaction;
    dynamically slowing down or speeding up at least one of the transactions which was previously identified as a transaction that is currently executing and using the primary resources needed by the first transaction; and
    after every commit operation, copying contents of the plurality of primary resources into a plurality of respective secondary resources at a plurality of checkpoints during execution of the second transaction;
    wherein the transaction is slowed down or sped up by dynamically changing a checkpoint interval during the second transaction by increasing or decreasing the time period between commit operations of the transaction or by adjusting how many records are to be processed in each sub-transaction of the transaction, said checkpoint interval comprising a time between two checkpoints; and
    wherein the amount of data stored at each checkpoint is dynamically variable.

2. The method according to claim 1, wherein at least one of the first transaction and the second transaction is a long running transaction in which batches of N records are processed in a plurality of iterations of a processing loop.

3. The method according to claim 1, wherein the first transaction is an online transaction.

4. The method according to claim 1, wherein the transaction is slowed down or sped up based on its priority and the priority of the first transaction.

5. The method according to claim 1, further comprising:
    determining whether a second SLA associated with the transaction that has been slowed down is being met; and
    speeding up the transaction if it is determined that the second SLA is not being met.

* * * * *